US008036667B2

(12) United States Patent
Arvidsson

(10) Patent No.: US 8,036,667 B2
(45) Date of Patent: Oct. 11, 2011

(54) METHOD AND DEVICES FOR DISTRIBUTING SERVICE REQUESTS TO SERVICE PROVIDERS

(75) Inventor: Ake Arvidsson, Ronneby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 881 days.

(21) Appl. No.: 11/721,463

(22) PCT Filed: Dec. 16, 2004

(86) PCT No.: PCT/EP2004/053546
§ 371 (c)(1),
(2), (4) Date: Jun. 12, 2007

(87) PCT Pub. No.: WO2006/063623
PCT Pub. Date: Jun. 22, 2006

(65) Prior Publication Data
US 2009/0298506 A1  Dec. 3, 2009

(51) Int. Cl.
*H04W 24/00* (2009.01)
*G06F 15/173* (2006.01)

(52) U.S. Cl. ........ 455/446; 709/203; 709/226; 709/227; 710/116; 710/240

(58) Field of Classification Search ........................ None
See application file for complete search history.

(56) References Cited

U.S. PATENT DOCUMENTS

| | | | |
|---|---|---|---|
| 6,629,176 B1 * | 9/2003 | Rhee | 710/240 |
| 7,197,566 B1 * | 3/2007 | Kuzma | 709/227 |
| 2004/0083289 A1 * | 4/2004 | Karger et al. | 709/226 |

* cited by examiner

*Primary Examiner* — Jinsong Hu
*Assistant Examiner* — William Nealon

(57) ABSTRACT

The invention relates to methods and devices for generating a distribution function. To that end preference vectors are defined for each instance something is distributed to from which elements are selected by means of an arbitration vector.

8 Claims, 1 Drawing Sheet

METHOD AND DEVICES FOR DISTRIBUTING SERVICE REQUESTS TO SERVICE PROVIDERS

TECHNICAL FIELD

The present invention relates to a method and devices for distributing service requests to service providers.

RELATED ART

In past years methods have been developed for distributing service requests to service providers. In particular in telecommunications networks there is a request for distributing traffic or, put into other words, to share load among network entities.

One example for such request for distribution is the pooling of devices like mobile services switching centre or base station controller. In such pools, devices with basically the same capabilities although perhaps different capacity are grouped. Or in other words, the pool comprises entities that are similar in a certain respect that is relevant for a connection. E.g. speech codecs (Coder/DECoder) may differ by the coding schemes they support, by the supplier they originate from and by their capacity, however, they may build a pool if they support the requested coding scheme for a particular connection. If a device from such pool is needed, it has to be selected.

One way to achieve this is for example to take an identity of a party involved, for example an IMSI (International Mobile Subscriber Identity), and to calculate a hash function from the IMSI according to the following formula (IMSI div 10) mod 1000. The hash values between 0 and 999 are then distributed to the respective devices, e.g. mobile services switching centres. However, this way requires either that each of the IMSI values and any group of IMSI occurs with the same probability.

A further suggestion for a distribution is to share equal fractions of the area from 0 to 999 among the mobile services switching centres. To that end, for M mobile services switching centres, a number n is mapped to an mobile services switching centre m by means of m=n mod M. This increases the probability that each mobile services switching centre receives a share of 1 div M of the whole traffic because the distribution of n mod M is inmost cases more randomly then the distribution of the IMSI. However, this solution has the shortcoming that it lacks means for introducing different capacities of the mobile services switching centre.

Another suggestion is to define certain ranges for each mobile services switching centre by command, for example a range from a to b for mobile services switching centre 1, and b+1 to c for mobile services switching centre 2 and so on. This has the advantage that different capacities can be introduced and taken care of. However, the method is quite cumbersome in the case that a further mobile services switching centre is added, a capacity change occurred or a mobile services switching centre is removed from the pool.

Therefore it is object of the invention to provide methods and devices to overcome the shortcomings of the prior art.

SUMMARY

The method has the advantage that only steps that do require a lower number of processor cycles have to be repeated if a system related to the distribution function is modified. The invented method for setting up or adapting a device for distributing service requests to service providers, comprises the steps of defining an arbitration vector that comprises at least one element for each element of a result space of a distribution function, defining a preference vector for a service provider, taking a value of the arbitration vector, determining the intended accumulated probabilities of selection for each service provider, wherein each probability is assigned to a respective rage between 0 and 1. It comprises the further steps of determining the range into that the value of the arbitration vector belongs, and the service provider to that the range is assigned, which will be called selected service provider in the following, taking a value from the preference vector assigned to the selected service provider, assigning in the result space of the distribution function an identity of the selected service provider to a value corresponding to the value of the preference vector, and repeating the steps of determining the intended accumulated probabilities, of determining the range, of taking a value from the preference vector, of assigning in the result space, and of taking the next value until each value of the result space is assigned to a service provider.

In an embodiment of the invention, the device for distributing is a device for determining a network node of a pool of network nodes that shall be used when handling a service request.

The method may comprise the additional steps of determining that a service provider identity has been already assigned to a value in the result space of the distribution function corresponding to the value taken from the preference vector and selecting a different value from the preference vector.

The distribution function can be implemented for example as a hash function and the result space may be a hash table.

In a preferred embodiment of the invention, the arbitration vector is determined only once for a telecommunications network, and the determination of a preference vector is done once for each service provider in a telecommunications network.

It is further object of the invention to provide a device for distributing service requests to service providers comprising an input output unit, a processing unit and a distribution function. The distribution function is set-up or adapted by the method.

In an embodiment of the invention, the device further comprises an input randomiser unit for performing a pseudo random function with an identity of a service requesting entity.

The randomiser unit can be adapted to scale the result to a range that corresponds with an input value range of the determining function of the determining unit.

DETAILED DESCRIPTION

In the following the invention will be further described by means of examples and by means of figures. In the following an example is combined with the description of FIG. 1 in order to make it easier to understand a particular embodiment of the invention.

Figure 1:
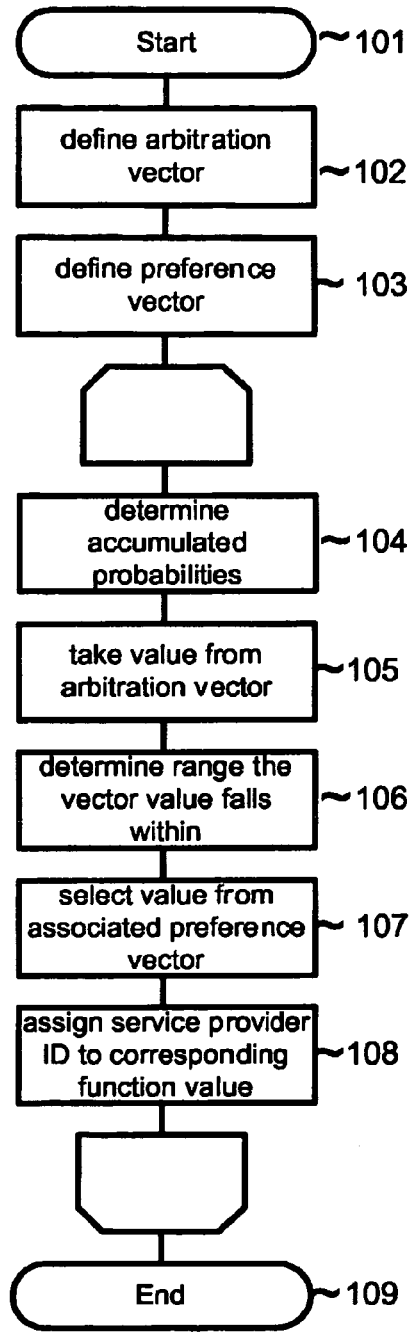
FIG. 1 depicts a flow of a method according to the invention.

FIG. 1 depicts a flow of a method according to the invention. The invented method starts in a first step 101. In a succeeding step 102 an arbitration vector is defined. The arbitration vector is comprises elements in a range that corresponds to accumulated probabilities. In a preferred embodiment of the invention, the arbitration vector comprises elements with values between 0 and 1 wherein 0 and 1 may be included. In the preferred embodiment the arbitration vector comprises one element for each result value of the distribution function. The arbitration vector values can be determined for example by means of a PRNG (Pseudo Random Number Generator). There exist embodiments of the invention, wherein an arbitration vector is not needed, in particular in the case that conflict free preference vectors are used. Example, an arbitration vector is generated with 10 elements by using a PRNG. The values used with said PRNG are $M=2736731631558$, $A=138$, $R=24^{48}$, $Z_0=13070439814660$, wherein $Z_{k+1}$ is calculated as $((M*Z_k+A) \bmod R)/R$ or $((M*Z_k+A) \bmod R)/(R-1)$. The first function leads to the following arbitration vector {0.40, 0.84, 0.35, 0.45, 0.32, 0.89, 0.02, 0.58, 0.16, 0.38}.

In a further step 103 a preference vector is defined. In a preferred embodiment of the invention, one preference vector is defined for each service instance. The preference vector comprises a sequence of distribution function values, wherein the sequence reflects an order of preference in which values of the distribution function shall be assigned to a service provider. The preference vector values can be determined for example by means of a PRNG. In an embodiment of the invention the preference vector for a service instance is determined once and then kept for said service instance. In a preferred embodiment of the invention, each preference vector comprises all values of the distribution function, however, not in the same sequence. If the capacities of the different service instances are known, then conflict free preference tables may be generated. However, using an arbitration vector instead of generating conflict free tables has the advantage that the tables do not have to be modified if the number or capacities of service providers change.

Example: in a distribution function with result space from 0 to 9, i.e. the function receives an input and generates a result within said result space. In the example it is more particular one of: 0, 1, 2, 3, 4, 5, 6, 7, 8, or 9. Three preference vectors $pv_1=\{2, 0, 6, 7, 5, 9, 8, 3, 4, 1\}$, $pv_2=\{6, 5, 8, 1, 7, 4, 2, 0, 3, 9\}$, and $pv_3=\{4, 9, 2, 7, 6, 1, 0, 5, 3, 8\}$ are defined. Each of these vectors is assigned to a service instance, which is one of the mobile services switching centre MSC1, MSC2, and MSC2. Certainly, a service instance could be any other entity used for providing a service, in particular any of a pooled device used in a cellular telecommunications network. For simplicity reasons we assign $pv_1$ to MSC1, $pv_2$ to MSC2 and $pv_3$ to MSC3. The capacities of the MSCs relate to each other as 1 to 2 to 3. The probability that a device is selected for serving should correspond to its capability; therefore it should be 1/6 for MSC1, 2/6 for MSC2 and 3/6 for MSC3. In a good appreciation it is 17% or 0.17 for MSC1, 0.33 for MSC2 and 0.5 for MSC3. The accumulated probability is then for MSC1 0.17, for MSC3 it is 0.5 that is 0.17+0.33; and for MSC3 it is 1 as the sum of 0.17+0.33+0.5. In another embodiment of the invention conflict free preference vectors are generated using the knowledge that for MSC1 2 values of ten, for MSC3 three values of ten and five values of ten for MSC3 should be selected. Conflict free vectors are then for example $v1=\{0,1\}$ for MSC1; $v2=\{2, 3, 4\}$ for MSC2, and $v3=\{5, 6, 7, 8, 9\}$ for MSC3.

In a step 105 a value is taken from the arbitration vector. In a preferred embodiment the values of the arbitration vector are taken consecutively from the first to the last value. Example: the first value of the arbitration vector is 0.40.

In a step 106 the range is determined, the value of the arbitration vector falls within. Example: the value of 0.40 is above the value of 0.17 but below the value of 0.5, thus it falls into the range of MSC2.

In a step 107, a value is selected from the associated preference vector. In a preferred embodiment of the invention the values of a preference vector are selected consecutively. Then it is checked whether the respective value is already assigned to a service instance. If it is already assigned, the consecutive value is selected, if not the value is kept. Example: the first value in the preference vector of MSC2 is 6.

In a step 108 an identification of the service provider is assigned to the corresponding value of the distribution function. Example: an identification of MSC2, for example an address of MSC2, is assigned to the value 6 of the distribution function.

In a preferred embodiment of the invention the steps 104 to 108 are repeated until an identity of a service instance is assigned to any of the distribution function values. Example: In a second execution of the steps the probabilities of 2/9 for MSC1, 2/9 for MSC2, because only two further values have to be selected from 9 for MSC2, and 5/9 for MSC3 are determined. This gives the rounded accumulated probabilities of 0.22 for MSC1, 0.44 for MSC2 and 1 for MSC3. The last value is always 1 and is not necessarily calculated. The next value of the arbitration vector is 0.84, which is above 0.44. Thus a value is selected from the preference vector assigned to MSC3. The first pv3 value is 4. Thus an identity of MSC3 is assigned to the result value 4 of the distribution function. The values of the result space are assigned to MSC IDs as defined after the first two steps is depicted as follows: {x, x, x, x, 3, x, 2, x, x, x}. Therein x means not defined, 2 is an ID of MSC2 and 3 is an ID of MSC3, the first x represents what is assigned to 0 and the last one what is assigned to 9. The other determination of the further values is depicted by means of the following table. It depicts in the first three columns the respective accumulated probabilities, in the forth column the respective arbitration vector value. Column five shows the MSC that is assigned to the range the arbitration vector value falls within. Column six comprises the preference vector value of the preference vector, which is the next one to select. The last column comprises the selected value that differs from the preference vector value if the preference vector value has already been assigned to an MSC. This is the case for three values of MSC3. Then the consecutive value is selected, unless, as for 0, with successor 5, this value has also already been assigned, here to MSC2.

| Accumulated probability for MSC1 | Accumulated probability for MSC2 | Accumulated probability for MSC3 | Arbitration vector value | Selected service instance | Preference vector value | Selected value |
|---|---|---|---|---|---|---|
| 0.25 | 0.5 | 1 | 0.35 | MSC2 | 5 | 5 |
| 0.28 | 0.43 | 1 | 0.45 | MSC3 | 9 | 9 |
| 0.33 | 0.5 | 1 | 0.32 | MSC1 | 2 | 2 |
| 0.2 | 0.4 | 1 | 0.89 | MSC3 | 2 | 7 |
| 0.25 | 0.5 | 1 | 0.02 | MSC1 | 0 | 0 |
| 0 | 0.33 | 1 | 0.58 | MSC3 | 6 | 1 |
| 0 | 0.5 | 1 | 0.16 | MSC2 | 8 | 8 |
| 0 | 0 | 1 | 0.38 | MSC3 | 0 | 3 |

The assignment of MSC IDs to distribution function values is then as follows: {1, 3, 1, 3, 3, 2, 2, 3, 2, 3}

The method ends in a step 109.

In the case that a change occurs in the system related to the distribution function, for example if the system is a telecommunications system if a further mobile services switching centre is introduced, the capacities are modified or a mobile services switching centre is removed from the pool, the hash table has to be modified. To that end only the steps 104 to 108 have to be repeated. It should be noted that the method for generating a distribution table is deterministic, that is that a given input, like load distribution factors, leads to a particular, reproducible result.

Figure 2:
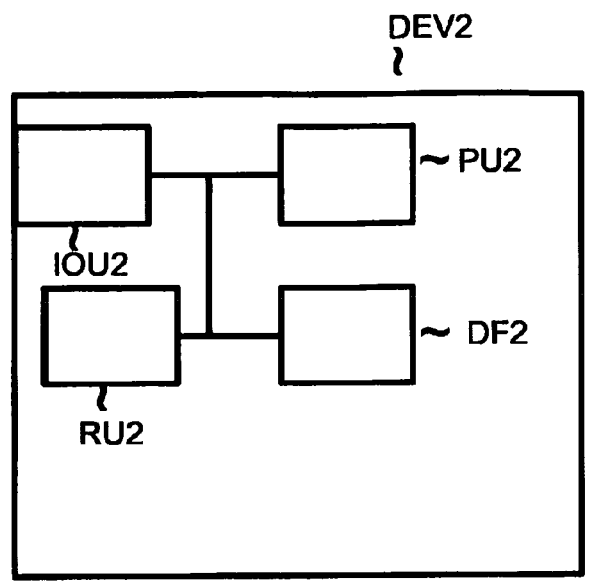
FIG. 2 depicts a device according to the invention.

FIG. 2 depicts a device according to the invention. The device DEV2 for distributing service requests to service providers comprising an input output unit IOU2, a processing unit PU2 and a distribution function DF2. The distribution function is set-up or adapted by a method according to claim 1. Example: the distribution function is a hash function that maps an input value to a result value of 0 to 9. According to the method of claim 1, the assignment of hash result value to the three MSCs has been defined with the following vector {1, 3, 1, 3, 3, 2, 2, 3, 2, 3} as described for FIG. 1.

In an embodiment of the invention, the device further comprises an input randomiser unit RU2. The unit randomises an input e.g. an identity of a service requester. In an embodiment of the invention, the input randomiser unit is adapted to scale the result to a range that corresponds with an input value range of the determining function of the determining unit. This increases the randomness of the input value and thus compensates a potential lack of equal distribution of input values.

The units and means of the control node, the device and the mobile station can be implemented by means of software, e.g. a software module, hardware, or a combination of both.

The invention claimed is:

1. A method for adapting a device for distributing service requests to service providers, wherein a processing unit executes the steps in the method, which comprises the steps of:
   a) Defining an arbitration vector that comprises one element for each element of a result space of a distribution function,
   b) Defining a preference vector for a service provider,
   c) Taking a value of the arbitration vector,
   d) Determining the intended accumulated probabilities of selection for each service provider, wherein each probability is assigned to a respective range between 0 and 1,
   e) determining the range in which the value of the arbitration vector belongs, and the service provider to which the range is assigned,
   f) taking a value from the preference vector assigned to the service provider of step d),
   g) assigning in the result space of the distribution function an identity of the service provider to a value corresponding to the value of the preference vector, and repeating the steps c), d), e), f) and g) until each value of the result space is assigned to a service provider.

2. The method according to claim 1, wherein the device for distributing is a device for determining a network node of a pool of network nodes that shall be used when handling a service request.

3. The method according to claim 1, with the additional steps of determining that a service provider identity has been already assigned to a value in the result space of the distribution function corresponding to the value taken from the preference vector and selecting a different value from the preference vector.

4. The method according to claim 1, wherein the distribution function is a hash function and the result space is a hash table.

5. The method according to claim 1, wherein the step a) is performed only once and the step b) is performed once for each service provider in a telecommunications network.

6. A device for distributing service requests to service providers, the device comprising: an input output unit, a processing unit and a distribution function for assigning the service requests, the distribution function comprising the steps:
   a) defining an arbitration vector that comprises one element for each element of a result space of a distribution function,
   b) defining a preference vector for a service provider,
   c) taking a value of the arbitration vector,
   d) Determining the intended accumulated probabilities of selection for each service provider, wherein each probability is assigned to a respective range between 0 and 1,
   e) determining the range into that the value of the arbitration vector belongs, and the service provider to that the range is assigned,
   f) taking a value from the preference vector assigned to the service provider of step d),
   g) assigning in the result space of the distribution function an identity of the service provider to a value corresponding to the value of the preference vector, and repeating the steps c), d), e), f) and g) until each value of the result space is assigned to a service provider.

7. The device according to claim 6 further comprising an input randomizer unit for performing a pseudo random function with an identity of a service requesting entity.

8. The device according to claim 6, wherein the randomizer unit is adapted to scale the result to a range that corresponds with an input value range of the determining function of the determining unit.

* * * * *